United States Patent
Lacher

(10) Patent No.: US 12,413,079 B2
(45) Date of Patent: Sep. 9, 2025

(54) POWER TOOL AND METHOD FOR CARRYING OUT CHARGE EQUALIZATION BETWEEN ACCUMULATORS IN A POWER TOOL

(71) Applicant: Hilti Aktiengesellschaft, Schaan (LI)

(72) Inventor: Michael Lacher, Schwabmünchen (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 18/561,547

(22) PCT Filed: Jun. 9, 2022

(86) PCT No.: PCT/EP2022/065661
§ 371 (c)(1),
(2) Date: Nov. 16, 2023

(87) PCT Pub. No.: WO2022/268514
PCT Pub. Date: Dec. 29, 2022

(65) Prior Publication Data
US 2025/0088012 A1 Mar. 13, 2025

(30) Foreign Application Priority Data
Jun. 23, 2021 (EP) ...................................... 21181105

(51) Int. Cl.
*H02J 7/00* (2006.01)
*B25F 5/00* (2006.01)
(52) U.S. Cl.
CPC .............. *H02J 7/0014* (2013.01); *B25F 5/00* (2013.01); *H02J 7/0063* (2013.01)
(58) Field of Classification Search
CPC .......... H02J 7/0014; H02J 7/0063; B25F 5/00
See application file for complete search history.

(56) References Cited

U.S. PATENT DOCUMENTS 5,631,534 A * 5/1997 Lewis ................. H01M 10/482
320/118
10,833,611 B2 * 11/2020 Cox ........................ H02P 25/22
(Continued)

FOREIGN PATENT DOCUMENTS

DE 112017002637 T5 4/2019
JP 2014204574 A 10/2014
(Continued)

OTHER PUBLICATIONS

International Search Report PCT/EP2022/065661 dated Sep. 30, 2022.
(Continued)

*Primary Examiner* — Carlos Amaya
(74) *Attorney, Agent, or Firm* — Davidson Kappel LLC

(57) ABSTRACT

A power tool having a first accumulator and a second accumulator, wherein the power tool has a first power electronics system with a first inverter and a second power electronics system with a second inverter, wherein the first inverter is electrically connected to the first accumulator and the second inverter is electrically connected to the second accumulator. The first power electronics system includes a first charge equalization device while the second power electronics system includes a second charge equalization device. The charge equalization devices are configured to carry out charge equalization between the accumulators. Furthermore, the power tool includes a device for speed control. In a second aspect, the invention relates to a method for carrying out charge equalization between two accumulators in a power tool. In this case, the charge equalization is preferably carried out by different load splitting via the charge equalization devices of the power electronics systems.

14 Claims, 9 Drawing Sheets

(56) References Cited

U.S. PATENT DOCUMENTS

| | | | |
|---|---|---|---|
| 11,451,078 B2* | 9/2022 | Lei | H01M 50/204 |
| 2017/0346334 A1 | 11/2017 | Mergener et al. | |
| 2020/0052524 A1* | 2/2020 | Mergener | H02J 7/00 |

FOREIGN PATENT DOCUMENTS

| | | |
|---|---|---|
| JP | 2019054612 A | 4/2019 |
| WO | WO2012/086852 | 6/2012 |
| WO | WO 2022/268513 A1 | 12/2022 |
| WO | WO2022/268514 A1 | 12/2022 |

OTHER PUBLICATIONS

International Search Report PCT/EP2022/065658 dated Sep. 28, 2022.

* cited by examiner

18a

18b

18c

POWER TOOL AND METHOD FOR CARRYING OUT CHARGE EQUALIZATION BETWEEN ACCUMULATORS IN A POWER TOOL

The invention relates to a power tool with a first accumulator and a second accumulator. In a second aspect, the invention relates to a method for carrying out charge equalization between two accumulators in a power tool.

BACKGROUND OF THE INVENTION

Power tools with which different types of work can be carried out are known in the prior art. For example, hammer drills, chisels, cut-off or angle grinders, screwdrivers or core drills are known in each of which a tool is driven by a motor. A power supply can be provided via a mains connection or with batteries or accumulators.

A number of applications of such power tools are known, in which high powers are required in order to carry out the corresponding work. In the case of power tools whose power supply is formed by an accumulator, it can happen that the power required for the work exceeds the maximum possible output power of the accumulator. In order to meet this challenge, such power tools are often equipped with an interface for two accumulators in order to be able to provide the desired power with two accumulators that can be connected in series or in parallel.

SUMMARY OF THE INVENTION

However, when working with power tools with two accumulators, the following problem can arise: If one of the accumulators is completely or partially discharged, full power cannot be provided for the power tool over the entire working period. As soon as one of the accumulators is completely discharged, no further power can be drawn from the accumulators. It may then be necessary to stop working with the power tool-despite the remaining charge present in one of the two accumulators.

Power tools with two accumulators, in which the accumulators are connected in series and are guided to a power electronics system, are known from the prior art. In conventional power tools of this kind, the power electronics system and the motor of the power tool are designed for a double operating voltage. In this case, the double operating voltage corresponds to double the voltage of one of the accumulators. For example, DE 11 2017 002 637 T5 discloses a system with two battery packs, wherein the first battery pack is selectively connected electrically in series with the second battery pack.

Furthermore, power tools whose motors comprise a plurality of winding systems or winding groups are known in the prior art.

One disadvantage of these power tools, as are known from the prior art, is that the total power is critically determined by the performance capability of the weaker accumulator in each case. Splitting the individual powers with regard to the state of the accumulator is not possible. According to the invention, such splitting of the individual powers is preferably referred to as "unidirectional adjustment". After the disconnection of an undervoltage in one of the two accumulators, there may be a considerable residual charge which also can no longer be utilized without charging the power tool or its accumulators.

An object of the present invention is therefore to overcome the above-described deficiencies and disadvantages of the prior art and to provide a power tool with at least two accumulators and a method for carrying out charge equalization between two accumulators in a power tool, with which improved charge equalization between the accumulators is to be made possible. A particular concern of the invention is also that the charge equalization should take place in both directions. Those skilled in the art would also appreciate it if a technical solution could be provided with which charge equalization between the accumulators of a power tool can be carried out at least also during operation or while working with the power tool.

In a first aspect, the present invention provides a power tool with a first accumulator and a second accumulator, wherein the power tool has a first power electronics system with a first inverter and a second power electronics system with a second inverter, wherein the first inverter is electrically connected to the first accumulator and the second inverter is electrically connected to the second accumulator. The first power electronics system comprises a first charge equalization device and the second power electronics system comprises a second charge equalization device, wherein the charge equalization devices are configured to carry out charge equalization between the accumulators. The power tool comprises at least one device for speed control, wherein the at least one device for speed control is connected upstream of the charge equalization devices.

The invention relates, in particular, to a drive system for an electric power tool. The power tool can comprise a brushless motor, wherein the motor according to the present invention is energized by two accumulators and power electronics systems which are separated from one another. In other words, a power tool with two separated power electronics systems, in which power tool the two accumulators are connected to the motor of the power tool by means of the power electronics systems, can be provided by the invention. It is preferred within the meaning of the invention that the components of the system are linked or interact with one another such that energization of the motor is optimized based on the states of the accumulators during normal operation of the power tool. This optimization can be achieved by way of the charge equalization devices of the power electronics systems being configured for carrying out charge equalization between the accumulators. It is preferred within the meaning of the invention that the charge equalization devices provided for carrying out charge equalization constitute control blocks for optimized splitting of a power between the accumulators. The charges are preferably equalized by currents or current flows, wherein the current flows can be ascertained using the formulae indicated below.

The at least one device for speed control is connected upstream of the charge equalization devices. In other words, this means that the speed control device is provided upstream of the "balancing control block" within the power electronics system. Therefore, the speed control device is provided upstream of the charge equalization device within the power path, i.e. the charge equalization takes place after any speed control. It is preferred within the meaning of the invention that the device for controlling the speed of the power tool is a constituent part of the power electronics system. It is preferred within the meaning of the invention that each of the two power electronics systems comprises a device for speed control. However, it may also be preferred that only one of the two power electronics systems has a speed control device.

In the context of the present invention, the electrical power path leads, starting from the two accumulators, via separated power electronics systems, to the motor of the power tool. The motor can—as will be outlined in more detail later—have separated winding systems. Within the meaning of the invention, this preferably means that the motor of the power tool, which preferably has a rotor and a stator, comprises two winding systems. Within the meaning of the invention the stator of the motor of the power tool comprises a first and a second winding system, so that the stator of the motor of the power tool is preferably referred to as a "double-wound stator" within the meaning of the invention. The motor preferably comprises a rotor and a stator with a first winding system and a second winding system. Within the meaning of the invention, it is particularly preferred that the winding system is in the form of a three-phase winding system. Within the meaning of the invention, this preferably means that the motor of the power tool preferably comprises three motor phases per winding system. It is provided within the meaning of the invention that a winding system in a three-phase motor comprises three windings, wherein the windings can be connected in star and or in delta.

The power electronics systems of the power tool each comprise an inverter. In this case, the first inverter is electrically connected to the first accumulator and the second inverter is electrically connected to the second accumulator. The electrically conductive connection between the inverters and the accumulators is preferably also referred to as "assignment of the inverters to the accumulators" within the meaning of the invention. The charge equalization between the accumulators of the power tool can be optimized in particular by way of the first and the second inverter of the power electronics systems being configured to ascertain state data relating to the accumulators. The state data can then be interchanged via a communication connection, which exists between the inverters. In this case, raw data can be exchanged, for example. However, it may also be preferred within the meaning of the invention for data that has already been processed or the results of evaluations and analyses which are carried out within the inverter to be exchanged. The communication connection may be in the form of, for example, a Controller Area Network (CAN) or a Universal Asynchronous Receiver Transmitter (UART).

The power electronics systems comprise sensors and/or measuring devices for detecting the state data. In this case, for example, voltages are preferably detected directly via a potentiometer by an internal analog/digital converter (ADC) and digitized. The current can be measured, for example, by means of a shunt, wherein in particular a voltage drop is ascertained and evaluated in order to obtain the values for the electric current.

It is very particularly preferred within the meaning of the invention that the power tool comprises a sensor system for detecting a position of the rotor of the power tool. This may preferably be an angle indication alpha_Rotor. This sensor system can preferably be supplied with electrical energy from the power electronics systems. It is preferred within the meaning of the invention that the position of the rotor of the power tool is detected and used in order to correctly energize the motor phases of the motor. Furthermore, the speed or the angular speed of the motor can also be ascertained from this sensor signal.

It is preferred within the meaning of the invention that the power electronics systems comprise control devices. Consequently, the first power electronics system comprises a first control device, while the second power electronics system comprises a second control device. It is preferred within the meaning of the invention that the control devices are preferably also referred to as "controllers". The sensors and measuring devices advantageously supply measurement and state data to the two controllers. It is preferred within the meaning of the invention that the measurement and state data ascertained by the sensors and measuring devices constitute for example angular signals, voltages, currents and/or temperatures. It is preferred within the meaning of the invention that, in particular, the control devices of the power electronics systems communicate with one another via the communication connection.

It is preferred within the meaning of the invention that the state data which are ascertained by the power electronics systems or their measurement and sensor systems comprise current values and/or voltage values which describe a performance of the accumulators. The power electronics systems can preferably ascertain a state of the accumulators associated with them by measuring the operating variables voltage (U1, U2) and/or current (I1, I2). Here, the index "1" stands for the current or voltage values of the first accumulator, while the index "2" describes the current or voltage values of the second accumulator. A substantial advantage of the invention is that a performance of the accumulators can be ascertained using the current and/or voltage values.

Charge equalization between the accumulators of the power tool can be rendered possible, for example, by optimization based on the voltage values of the accumulators. Charge equalization is performed, in particular, using the charge equalization devices of the power electronics systems of the power tool. These charge equalization devices constitute what are known as "balancing control blocks", in which the equalization currents are preferably given as follows:

$$I_{equalized\_1} = I \cdot U_1/(U_1 + U_2) \text{ and } I_{equalized\_2} = I \cdot U_2/(U_1 + U_2)$$

Here, the letter "I" preferably stands for the target current from the speed controller.

It is preferred within the meaning of the invention that the state data for optimizing the charge equalization are selected from a group comprising: charge of the accumulators, temperature of the accumulators, source voltage of the accumulators, maximum discharge current of the accumulators and/or optimum discharge current of the accumulators, without being restricted to these. Furthermore, a temperature of the electronics system of the power tool can be used to optimize charge equalization between the two accumulators of the power tool. In general form, the above-mentioned formula can be described using further optimization criteria k and weightings n as follows:

$$I_{equalized\_2} = I \cdot (n_1 \cdot k_1 + n_2 \cdot k_2 + n_3 \cdot k_3 + \dots)$$

In order to use further optimization potential, properties and states of the accumulators can be detected via a communication connection to a battery management system (BMS) and/or a cell management system (CMS). In the context of the present invention, the term "cell management system (CMS)" can also be used as a synonym for the term "cell managing system (CMS)". In addition, the power tool can comprise a battery management system and/or a cell management system, wherein the battery management system and/or the cell management system are/is configured to detect state data relating to the accumulators of the power tool. A refinement of the invention with a battery management system (BMS) is depicted in FIG. 6.

Within the meaning of the invention, it is preferred that the power electronics systems comprise devices for current control. These devices for current control are preferably connected downstream of the charge equalization devices. In other words, this means that the current control device is provided downstream of the "balancing control block" within the power electronics system. Therefore, the current control device is preferably provided downstream of the charge equalization device within the power path, i.e. the charge equalization is performed before any current control. It is preferred within the meaning of the invention that the device for controlling the current is a constituent part of the power electronics system.

It is preferred within the meaning of the invention that the device for speed control, the device for current control and/or the inverters are implemented in the form of block, trapezoidal or sinusoidal commutation.

In a second aspect, the invention relates to a method for carrying out charge equalization between two accumulators in a power tool, wherein the method is characterized by the following method steps:
 a) operating the power tool, wherein a motor of the power tool is supplied with electrical energy by the first accumulator and the second accumulator,
 b) ascertaining state data relating to the accumulators using the power electronics systems,
 c) carrying out speed control using an device for speed control of the power tool,
 d) carrying out charge equalization between the accumulators as a function of the previously ascertained state data using the charge equalization devices of the power electronics systems.

The charge equalization is advantageously carried out by different load splitting by means of the charge equalization devices of the power electronics systems.

In the structure of an electric motor, a rotor is arranged inside the motor, while the stator is arranged around the rotor. The stator can, for example, comprise three stator coil pairs, each of which can consist of a first and a second stator coil. The stator coils can in particular be arranged in a circle around the rotor of the motor of the power tool. It is preferred within the meaning of the invention that the stator coils of a stator coil pair are substantially opposite one another within the stator.

It is preferred within the meaning of the invention that the stator coils of the stator are wound identically or substantially identically in the sense that their windings comprise a first wire layer and a second wire layer, with the wire layers being formed in such a way that they allow operation of the motor of the power tool at a speed in the range of the speed of a comparison motor, but at substantially half the power compared with the comparison motor. The operation of the motor at half the power compared with a comparison motor is made possible in particular by the provision of two wire layers present in the stator coils and forming a first and a second winding of the stator of the motor of the power too.

In one refinement of the invention, it is preferred that the first stator coils comprise the first winding and the second stator coils comprise the second winding. In this refinement, the stator preferably comprises three coil pairs, wherein each pair comprises first and a second coil. The first coils, i.e. the first coil of the first, the second and the third coil pair, comprise the first winding of the stator, while the second coils, i.e. the second coil of the first, the second and the third coil pair, comprise the second winding of the stator. Such a preferred refinement of the invention is illustrated in FIG. 4.

It is preferred within the meaning of the invention that the stator is wound twice in a substantially identical manner. The provision of a stator with two windings is preferably referred to as a "double-wound stator" within the meaning of the invention. The "double winding" is achieved in particular by the first winding and the second winding of the stator, the windings each comprising a wire layer. The winding with the first wire layer forms the first winding of the stator coil and the winding with the second wire layer forms the second winding of the stator coil. Preferably, each of the windings is designed such that the winding can operate the power tool motor at full speed and half power. The double-wound stator thus acts like two individual motors, which, however, are arranged or wound on a stator. It is preferred within the meaning of the invention that the partial powers of the two windings substantially add up to the total power of a comparison motor, the stator coils of the comparison motor being substantially completely wrapped with a continuous wire layer. In other words, this last subordinate clause preferably means that the full or half power or speed is specified in the context of the present invention in relation to a comparison motor, the notional comparison motor being characterized in that it is substantially completely wrapped with a continuous wire layer. It is preferred within the meaning of the invention that the coils of the comparison motor have the same number of turns, but twice the wire diameter, compared to the coils of the motor of the present invention. In other words, the coils of the comparison motor are wound with a wire whose diameter is substantially twice the size of that in the motor of the present invention.

It is preferred within the meaning of the invention that the first winding of the stator coils is energized by a first inverter, while the second winding of the stator coils is energized by a second inverter, so that the sum of the two windings allows a power in the range of the comparison motor to be provided for the motor of the power tool. In other words, substantially the entire power of a comparison motor can be approached if the windings of the stator are each energized by an inverter. Preferably, each winding contributes substantially half of the total power of a comparison motor. In other words, the nominal contribution of each of the two winding layers is approximately 50% of the power of the comparison motor.

It is preferred within the meaning of the invention that the comparison motor does not comprise two windings or two wire layers, but only one winding and one wire layer that forms the winding.

In the context of the invention, a method for operating a power tool is provided, wherein the first winding of the stator coils is energized by a first inverter, while the second winding of the stator coils is energized by a second inverter, so that a power in the range of the comparison motor is provided for the motor of the power tool. It is particularly preferred within the meaning of the invention that the full power of the motor can be provided by energizing the windings through the two inverters, with this full power preferably corresponding to the full power of the comparison motor.

It is preferred within the meaning of the invention that the first wire layers of the stator coils, which form a first winding, are energized by a first inverter, while the second wire layers, which form a second winding, are energized by a second inverter.

It is preferred within the meaning of the invention that the power tool comprises a first accumulator and a second accumulator. With the double-wound stator in the context of the present invention, charge equalization between the accumulators of the power tool can be carried out in a particularly simple manner. In particular, it is possible for the charge equalization to take place in both directions. This charge equalization on both sides can take place in particular when the power tool is at a standstill.

It is preferred within the meaning of the invention that the first accumulator has a first charge state and the second accumulator has a second charge state, with the charge states being able to be equalized by means of the charge equalization described above, in particular with the aid of the bridge circuit, when the power tool is at a standstill. For example, if the first charge state of the first accumulator is 75% and the second charge state of the second accumulator is 25%, charge equalization can be carried out with the invention with the aim that at its end both accumulators have a charge state of around 50%. In particular, charge equalization carried out in this way enables the power tool to be used effectively for longer because the charges can be better distributed within the accumulators and can thus be utilized. In particular, the situation is avoided in which work with the power tool has to be ended although one of the accumulators is still well charged.

FIG. 3 shows a preferred refinement of the invention, in which the first winding is connected to a first accumulator via a first inverter, while the second winding is connected to a second accumulator via a second inverter. With the circuit shown in FIG. 3, charge equalization can advantageously be made possible both during operation and when the power tool is at a standstill.

In the context of the present invention, a method for carrying out charge equalization between two accumulators in a power tool is also disclosed, wherein the power tool comprises a first inverter for energizing first stator coils and a second inverter for energizing second stator coils, wherein the inverters form a bridge circuit with the stator coils that is configured to carry out charge equalization between the accumulators of the power tool. It is preferred within the meaning of the invention that the stator coils form a stator that has a first winding and a second winding, with charge equalization being achieved by electrical energy being transferred from the first winding to the second winding of the stator, or vice versa.

BRIEF DESCRIPTION OF THE DRAWINGS

Further advantages will become apparent from the following description of the figures. An exemplary embodiment of the present invention is depicted in the figures. The figures, the description and the claims contain numerous features in combination. A person skilled in the art will expediently also consider the features individually and combine them to produce useful further combinations.

Identical and similar components are denoted by the same reference signs in the figures, in which.

DETAILED DESCRIPTION

FIGS. 1 to 4 disclose details of the motor 12 of the power tool 10. Details and circuit diagrams of the method for carrying out charge equalization and of the power tool 10 provided for said method can be found in FIGS. 5 to 8.

Figure 1:
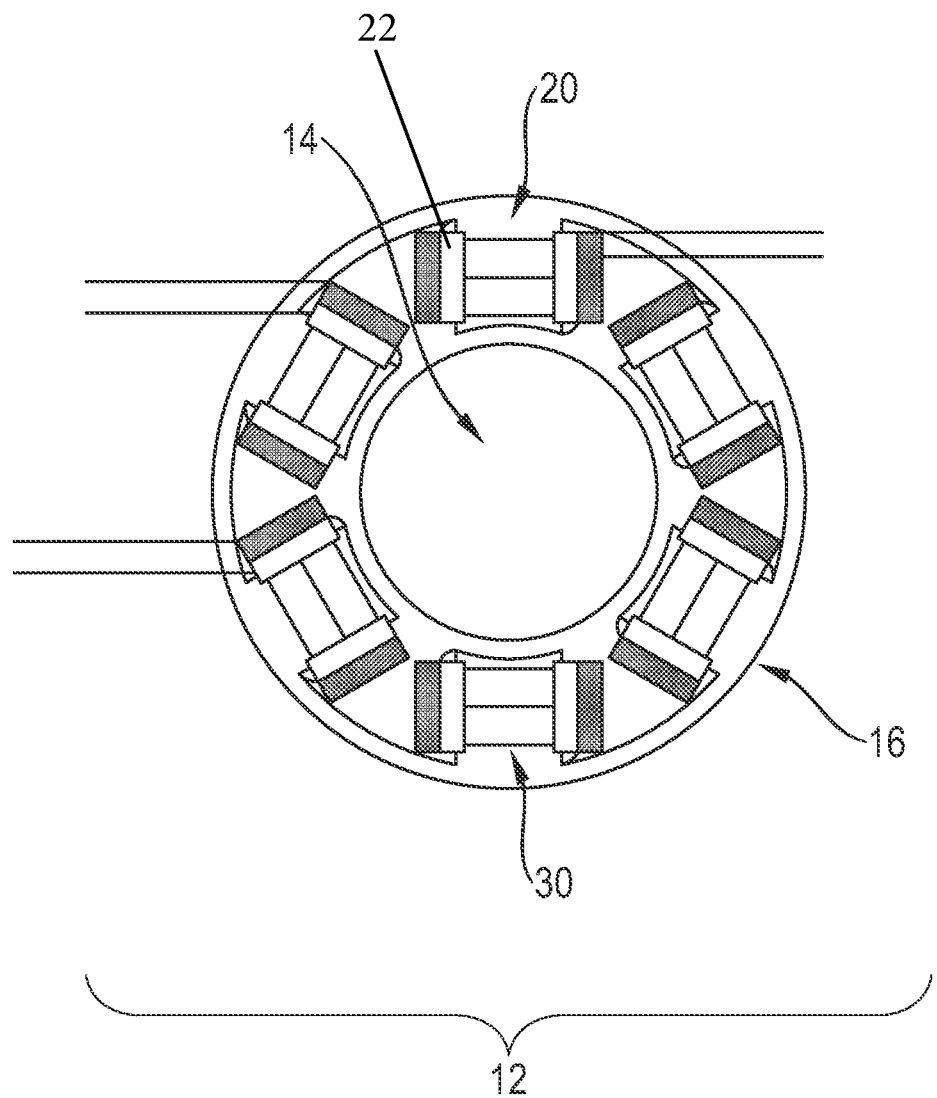
FIG. 1 shows an exemplary embodiment of a double-wound stator according to a preferred refinement of the invention

FIG. 1 shows an exemplary refinement of the motor 12 of the power tool 10, with a power tool 10 not being shown in the figures. In FIG. 1 there can be seen the rotor 14 and the stator 16 of the motor 12 of the power tool 10, which is preferably a brushless electric motor. The stator 16 comprises a series of stator coils 20, 30 which can be arranged in pairs, for example, or can form stator coil pairs 18a, 18b, 18c (see, e.g., FIG. 2). In each case one group of stator coils can preferably be referred to as first stator coils 20 and the other group of stator coils can preferably be referred to as second stator coils 30. The stator 16 of the motor 12 of the power tool 10 comprises a first winding 70 and a second winding 80, it being possible for the windings 70, 80 to each comprise a wire layer (see, e.g. FIG. 3). It is preferred within the meaning of the invention that the first winding 70 comprises a first wire layer, while the second winding 80 comprises a second wire layer. In one possible refinement of the invention, each stator coil 20, 30 comprises a first wire layer and a second wire layer, the first wire layers of the stator coils 20, 30 forming the first winding 70 of the stator 16, while the second wire layers of the stator coils 20, 30 form the second winding 80 of the stator 16. In another refinement of the invention, the first stator coils include the first winding and the second stator coils the second winding. In other words, in this refinement of the invention, the first winding 70 is wound around the group of first stator coils 20, while the second winding 80 is wound around the group of second stator coils 30.

Each of the two windings 70, 80 allows the power tool 10 to be operated in such a way that full speed can be achieved, but only half the power compared with the operation of a comparison motor. The comparison motor substantially corresponds to the motor, but the stator of the comparison motor has only one winding, i.e. one wire layer. Preferably, each of the two windings 70, 80 of the double-wound stator 16 is energized by an inverter 24, 34, with the first winding 70 of the stator 16 of the motor 12 of the power tool 10 being energized by the first inverter 24, while the second winding 80 of the stator 16 of the motor 12 of the power tool 10 is energized by the second inverter 34. As a result, the total power of the motor 12 can advantageously be approached, with each winding layer 70, 80 nominally contributing substantially 50% to the power of the motor 12. The lines coming from the rotor 12 in FIG. 1 preferably run in the direction of the inverters 24, 34.

It is preferred within the meaning of the invention that the stator 16 of the power tool 10 has stator coils 20, 30, with the stator coils 20, 30 forming a bridge circuit 90 with the inverters 24, 34. The motor 12 of the power tool 10 is preferably a brushless motor.

In addition, FIG. 1 shows the electrical lines, which can exist between the first wire layers 22 of adjacent stator coils 20, 30 in each case. Electrical lines can be arranged on the inside of the stator 16 and in each case connect the first wire layers within a stator coil 20, 30 to one another. The inside of the stator 16 preferably faces the rotor 14 of the motor 12 of the power tool 10, since the rotor 14 of the motor 12 of the power tool 10 is arranged inside the motor 12 of the power tool 10.

Figure 2A:
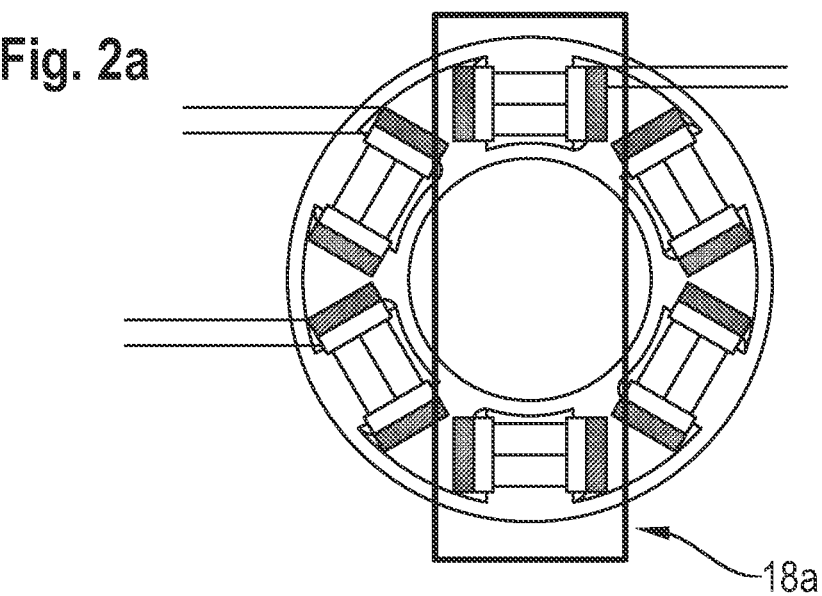
FIGS. 2a, 2b, 2c show an illustration of a possible refinement of the stator with three stator coil pairs
Figure 2B:
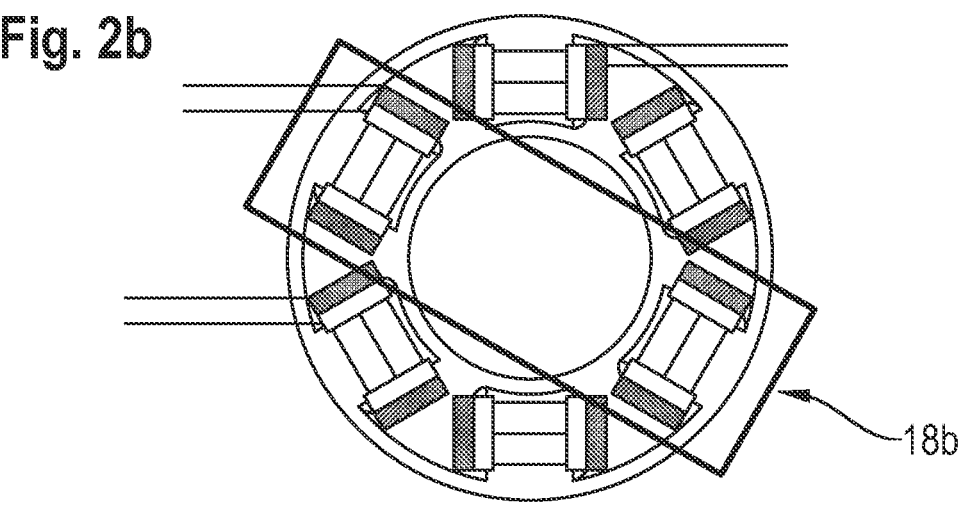
Figure 2C:
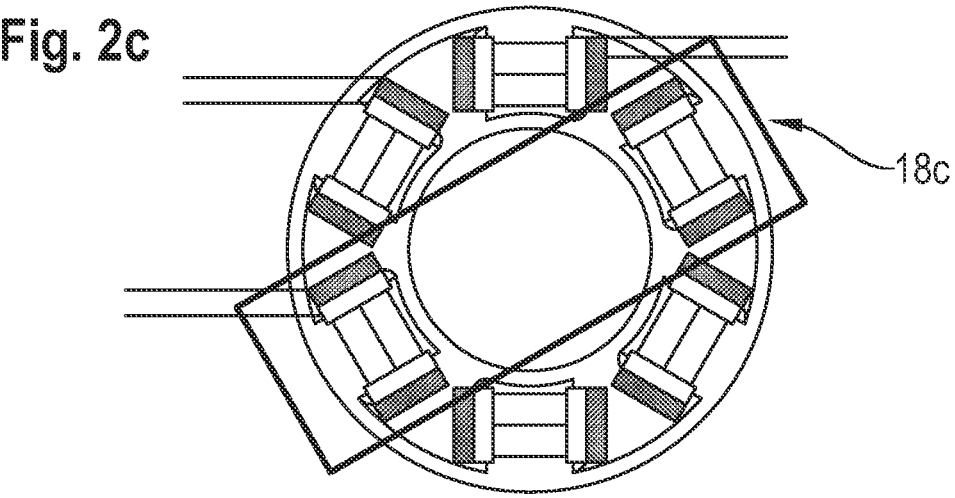

FIGS. 2a, 2b, 2c shows a possible embodiment of the stator 16 of the motor 12 of the power tool 10 with three stator coil pairs 18. Each stator coil pair 18a, 18b, 18c preferably comprises a first stator coil 20 and a second stator coil 30, with this first stator coil 20 and the second stator coil 30, which together form a stator coil pair 18, preferably being situated opposite one another in the stator 16 of the motor 12 of the power tool 10. The three stator coil pairs 18 are designated as stator coil pairs 18a, 18b and 18c in FIG. 2 and sub-FIGS. 2a, 2b and 2c.

Figure 3:
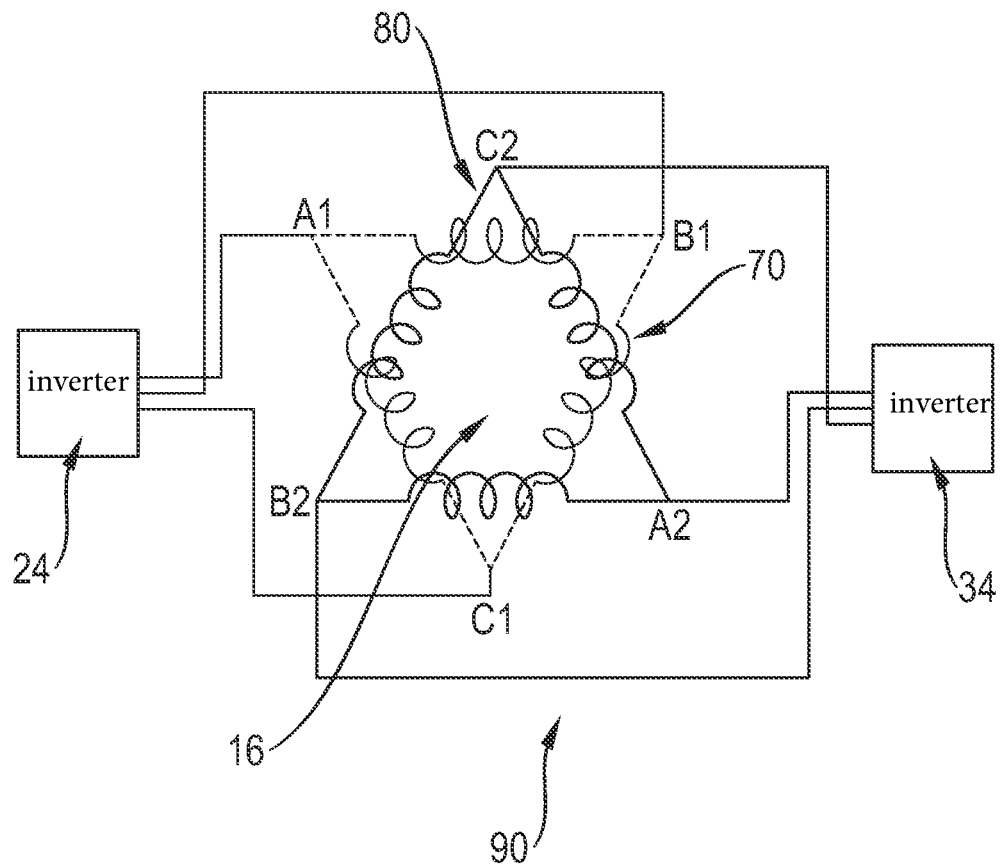
FIG. 3 shows an exemplary circuit diagram for a double-wound stator with two accumulators

FIG. 3 shows a circuit diagram for a preferred embodiment of the double-wound stator 16 with two inverters 24, 34. The stator 16 of the motor 12 of the power tool 10 is shown in the center of FIG. 3. The letters A, B, C stand for the three stator coil pairs 18a, 18b and 18c, while the numbers 1 and 2 indicate whether it is the first stator coil 20 or the second stator coil 30 of a stator coil pair 18. In other words, the stator coils A1, B1, C1 form the first stator coils 20 of the stator coil pairs 18, while the stator coils A2, B2 and C2 form the second stator coils 30 of the stator coil pairs 18. The first stator coils A1, B1, C1 are preferably connected to a first inverter 24, while the second stator coils A2, B2 and C2 are preferably connected to a second inverter 34. It is preferred within the meaning of the invention that the inverters 24, 34 and the stator coils 20, 30 form a bridge circuit 90 or an H-bridge, with charge equalization between the accumulators 40, 50 of the power tool 10 being able to be allowed via this bridge circuit 90. This is possible in particular because the motor 12 of the power tool 10 is used as a direct current/direct current converter. This allows electrical energy to be transferred from the first winding 70 of the stator 16 to the second winding 80 of the stator 16, or vice versa. Owing to the possibility of transferring electrical energy from one winding 70 of the stator 16 to another winding 80, the energy can also be transferred from one accumulator 40 to the other accumulator 50, so that any differences in charge can be equalized. This method for charge equalization can be carried out in particular when the power tool 10 is at a standstill. Its particular advantage is that electrical energy can be transmitted in both directions.

With the invention of the double-wound stator 16, charge equalization can also be carried out during the operation of the power tool 10. For this purpose, the inverter (e.g.: 24), which is connected to the accumulator to be charged (e.g.: 40, see. e.g., FIG. 5), can be switched over from motor operation to generator operation. As a result, the capacity of the fuller accumulator (e.g.: 50) can be used to recharge the accumulator (e.g.: 40) with the lower charge state. This method can be made possible in particular by imparting a small braking torque.

Figure 4:
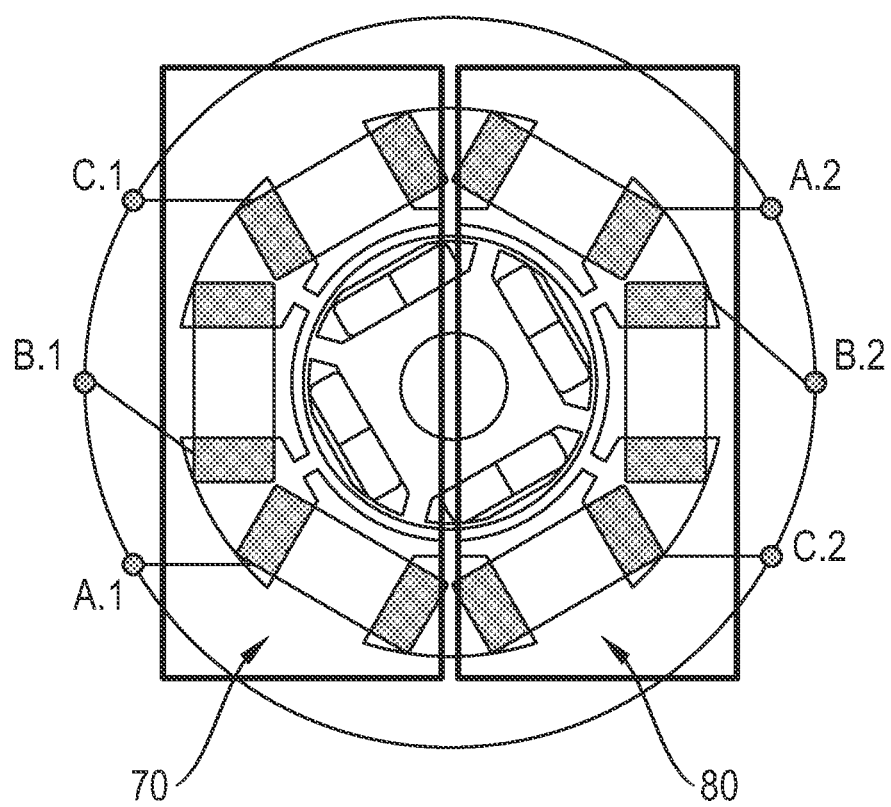
FIG. 4 shows an illustration of a preferred refinement of the stator, in which the first and the second winding are respectively arranged on the first and second coils of the stator coil pairs

FIG. 4 shows an illustration of a preferred refinement of the stator 16, in which the first winding 70 and the second winding 80 are respectively arranged on the first coils 20 and second coils 30 of the stator coil pairs 18. In other words, it is preferred that the first stator coils 20 comprise the first winding 70 of the stator 16 and the second stator coils 30 comprise the second winding 80 of the stator 16. In this refinement of the invention, the stator 16 preferably comprises three coil pairs 18, with each coil pair 18a, 18b, 18c comprising a first coil 20 and a second coil 30. The first coils 20, i.e. the first coil 20 of the first coil pair 18a, of the second coil pair 18b and of the third coil pair 18c, comprise the first winding 70 of the stator 16 of the motor 12 of the power tool 10, while the second coils 30, i.e. the second coil 30 of the first coil pair 18a, of the second coil pair 18b and of the third coil pair 18c, comprise the second winding 80 of the stator 16. The first stator coils 20 are designated A1, B1, C1 in FIG. 4, while the second stator coils 30 are designated A2, B2, C2 in FIG. 4.

It is preferred within the meaning of the invention that the embodiment of the invention shown in FIG. 4 can also be used for operating the motor 12 of the power tool 10 or for carrying out charge equalization between the accumulators 40, 50. In this case, the first winding 70 of the stator 16 is energized by a first inverter 24, while the second winding 80 is energized by a second inverter 34. The windings 70, 80 are designed such that they can operate the motor 12 of the power tool 10 at full speed, but at half the power compared with a comparison motor. In total, the full power can be provided for operation of the power tool 10 by energizing the two windings 70, 80. In the context of this preferred refinement of the invention, the inverters 24, 34 and the stator coils 20, 30 also form a bridge circuit 90 or an H-bridge, with which charge equalization between the accumulators 40, 50 can be carried out. Charge equalization is preferably performed by way of electrical energy being transmitted from the first winding 70 to the second winding 80 of the stator 16, or vice versa.

Figure 5:
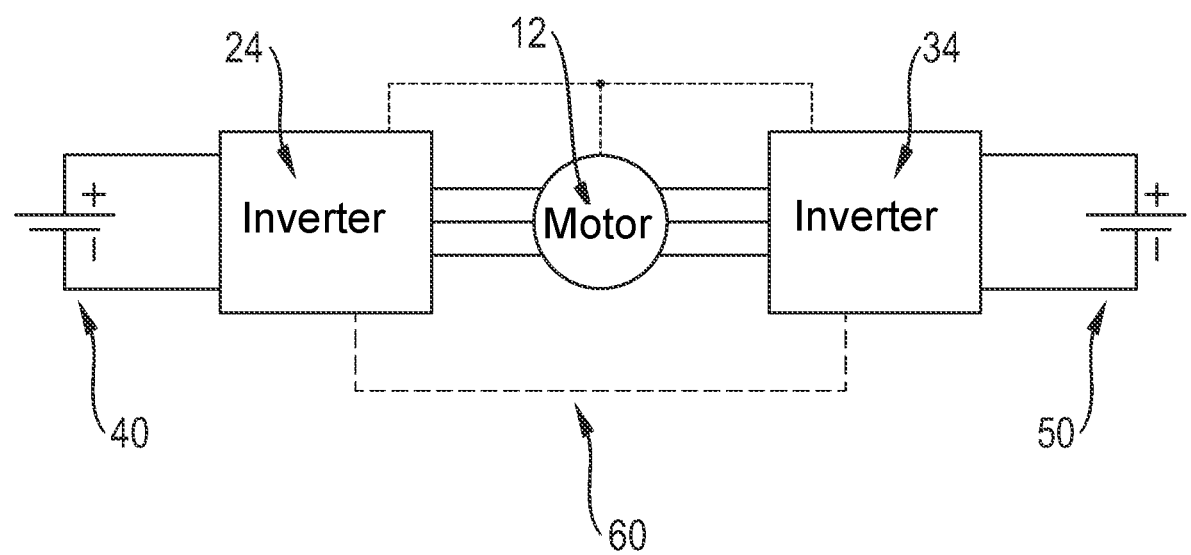
FIG. 5 shows an exemplary structure of a basic circuit of a power tool with two accumulators

FIG. 5 shows an exemplary structure of a basic circuit of a power tool 10 with two accumulators 40, 50. The accumulators 40, 50 are connected to the motor 12 of the power tool 10 by means of the motor inverters 24, 34 and supply the motor 12 with electrical energy. In particular, the first accumulator 40 is connected to the motor 12 by means of the first inverter 24, while the second accumulator 50 is connected to the motor 12 by means of the second inverter 34. A communication connection 60 exists between the inverters 24, 34, via which communication connection state data of the components of the power tool 10 or operating parameters can be exchanged. The inverters 24, 34 are each a constituent part of a power electronics system 120, 130 (see, e.g., FIG. 8) and control the supply of electrical energy to the motor 12 or charge equalization between the accumulators 40, 50. It is preferred within the meaning of the invention that the first inverter 24 is a constituent part of the first power electronics system 120, while the second inverter 34 is a constituent part of the second power electronics system 130. The communication connection 60 may be in the form of a CAN or UART connection.

Figure 6:
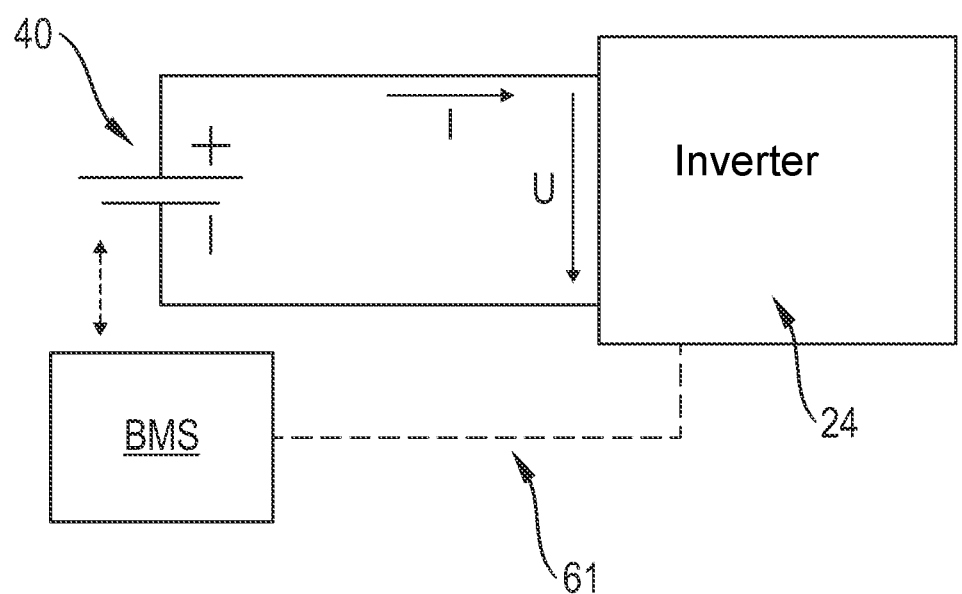
FIG. 6 shows an illustration of a preferred embodiment of the invention with a battery management system (BMS)

FIG. 6 shows a preferred embodiment of the invention with a battery management system (BMS). In particular, FIG. 6 shows a detail of the first power electronics system 120 of the power tool 10. The first power electronics system 120 comprises the first motor inverter 24, which is configured to communicate with the battery management system (BMS) via a second communication connection 61. In FIG. 6, the letter «I» stands for the battery current, and the letter «U» stands for the battery voltage. These variables are preferably required for the charge equalization devices 100, 110.

Figure 7:
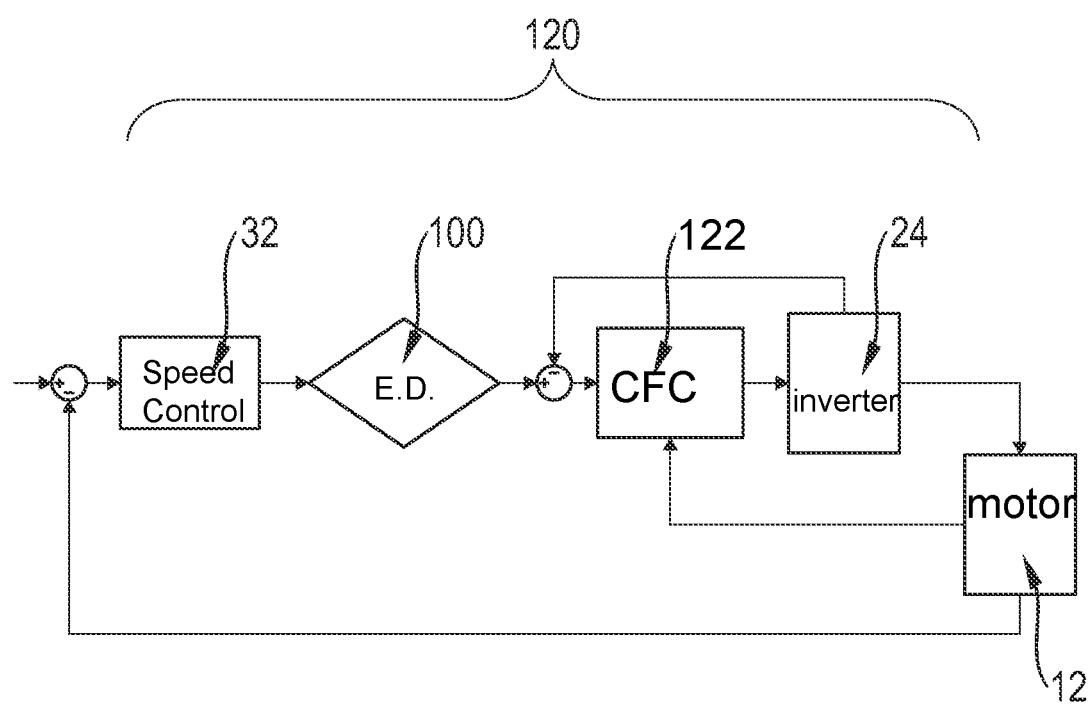
FIG. 7 shows an exemplary structure of a preferred embodiment of the first power electronics system of the power tool with two accumulators

FIG. 7 shows an exemplary structure of a preferred embodiment of the first power electronics system 120 of the power tool 10 with two accumulators 40, 50. A device for speed control 32, a first charge equalization device 100, a device 122 for controlling a current flow and a first inverter 24 are depicted as components of the first power electronics system 120 in FIG. 7. Within the meaning of the invention, the charge equalization device 100 can preferably also be referred to as a "balancing control block". It is preferred within the meaning of the invention that the power tool 10 has a first power electronics system 120 and a second power electronics system 130, with the second power electronics system 130 preferably being constructed in a manner corresponding to the first power electronics system 120. Starting from the motor 12, the second power electronics system 130 comprises a second inverter 34, a device 22 for controlling a current flow, a second charge equalization device 110 and a device for speed control 32.

Figure 8:
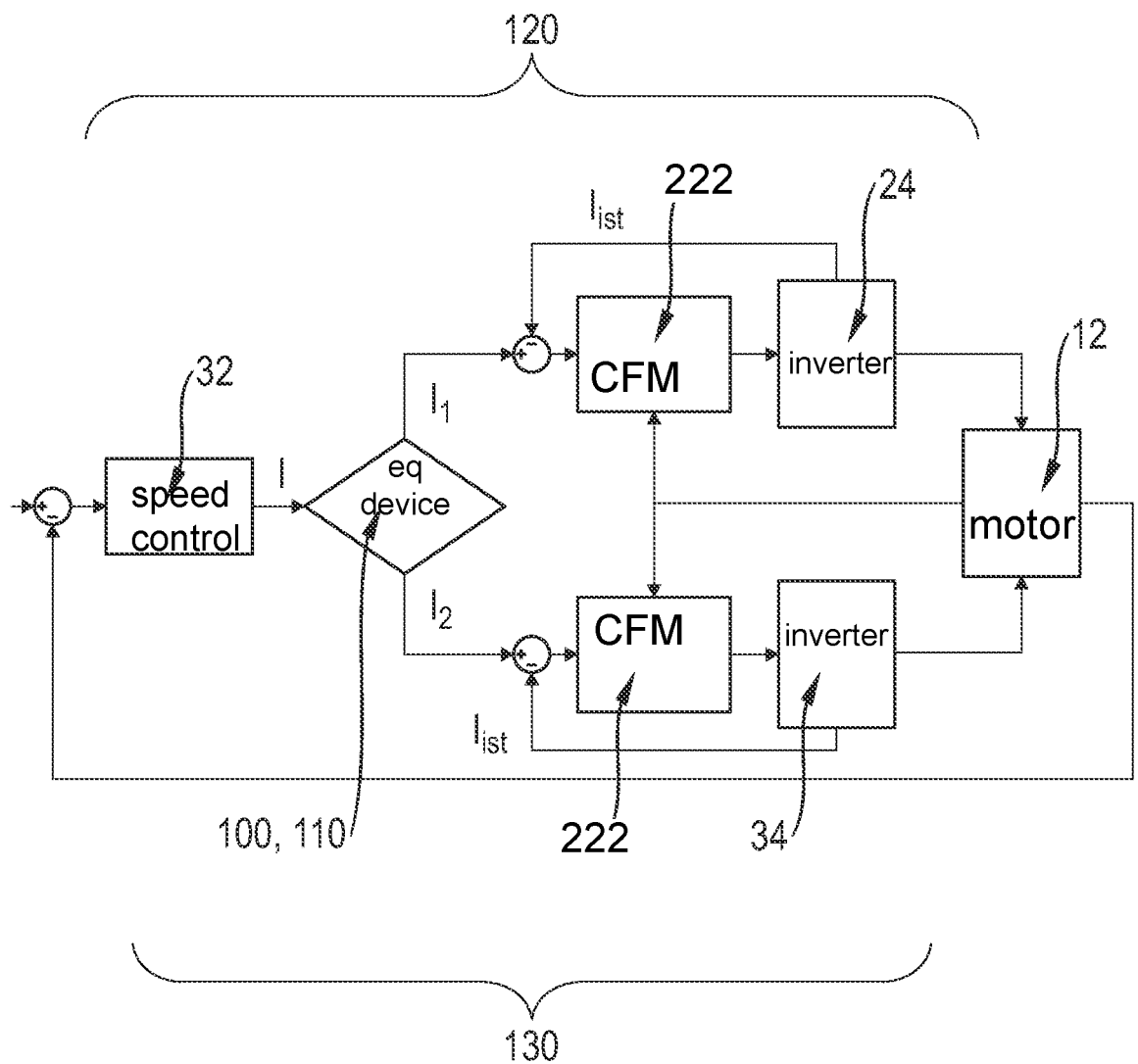
FIG. 8 shows an illustration of a preferred embodiment of the invention with just one speed controller

FIG. 8 shows a preferred embodiment of the invention with just one device for speed control 32. It can be preferred within the meaning of the invention that the power tool 10 comprises only one device for speed control 32, which is then preferably arranged upstream of the charge equalization devices 100, 110. In the refinement of the invention illustrated in FIG. 8, the power path again splits into a first power electronics system 120 and a second power electronics system 130 downstream of the charge equalization device 100, 110, with the first power electronics system 120 comprising a device 222 for measuring a current flow, as well as a first motor inverter 24. The second power electronics system 130 preferably likewise comprises a device 222 for measuring a current flow, as well as the second motor inverter 32.

It is preferred within the meaning of the invention that the power tool 10 comprises a charge equalization device (100 or 110), with this one charge equalization device (100 or 110) being connected to one of the inverters (24 or 34) or being a constituent part thereof. However, it may also be provided within the meaning of the invention that the power tool 10 comprises two charge equalization devices (100 or 110), with a respective charge equalization device (100 or 110) being associated with each inverter 24, 34. The actual currents I_act, which come from the inverter blocks 24, 34, are also depicted in FIG. 8. The current "I" between the speed controller 32 and the charge equalization device (100 or 110) symbolizes the target current from the speed controller 32.

Figure 9A:
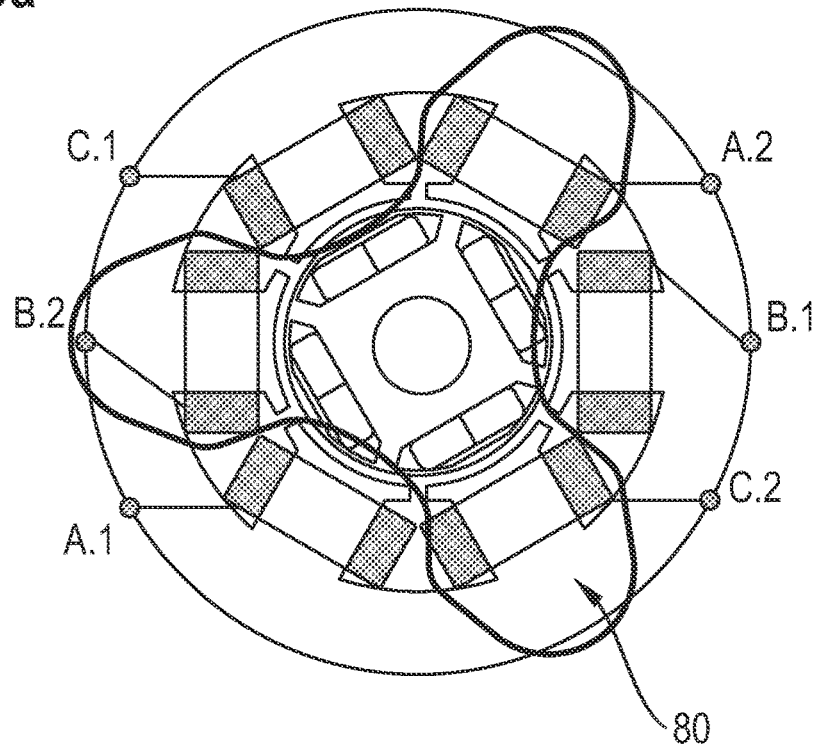
FIGS. 9a and 9b show an illustration of a preferred embodiment of the two winding systems of the invention
Figure 9B:
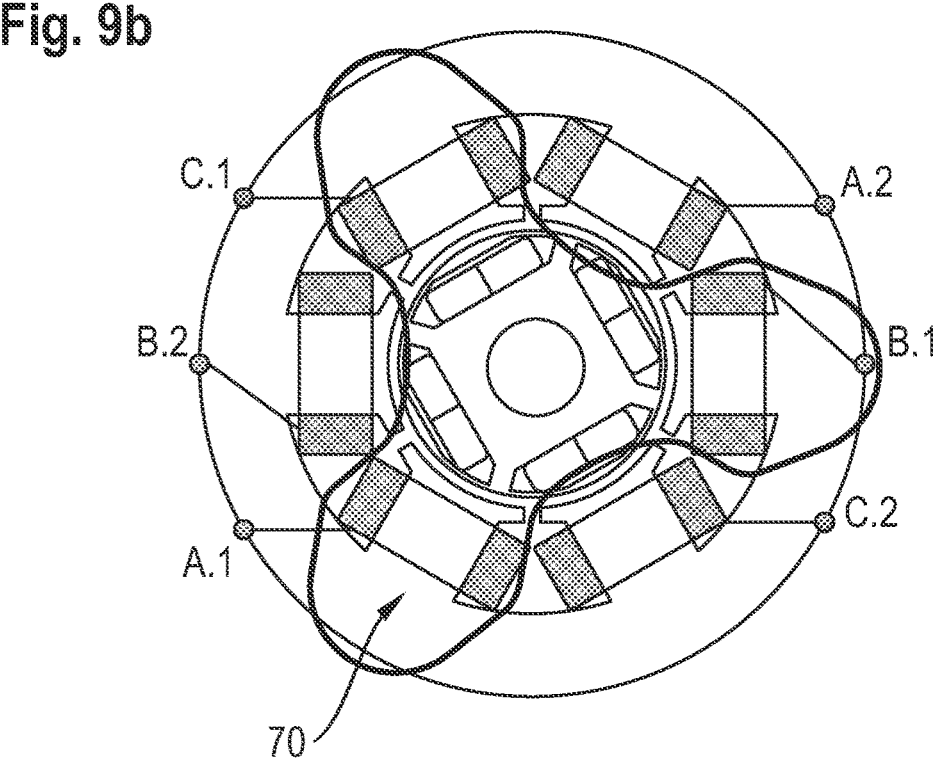

FIGS. 9a and 9b show a preferred embodiment of the two winding systems 70, 80 of the invention.

LIST OF REFERENCE SIGNS

10 Power tool
12 Motor of the power tool
14 Rotor
16 Stator
18 Stator coil pair
20 First stator coil
22 Device for current control
24 First inverter
30 Second stator coil
32 Device for speed control
34 Second inverter
40 First accumulator
50 Second accumulator
60 Communication connection between the inverters
61 Second communication connection between an inverter and the battery management system (BMS)
70 First winding
80 Second winding
90 H-bridge or bridge circuit
100 First charge equalization device
110 Second charge equalization device
120 First power electronics system
130 Second power electronics system

What is claimed is:

1. A power tool comprising:
a first accumulator;
a second accumulator;
a first power electronics system with a first inverter;
a second power electronics system with a second inverter, wherein the first inverter is electrically connected to the first accumulator and the second inverter is electrically connected to the second accumulator;
the first power electronics system including a first charge equalizer and the second power electronics system including a second charge equalizer, the first and second charge equalizers configured to carry out charge equalization between the first and second accumulators; and
a speed controller, the speed controller connected upstream of the first and second charge equalizers;
the first and second power electronics system each having a current flow controller downstream of the first and second charge equalizers.

2. The power tool as recited in claim 1 further comprising a motor having a rotor and a stator with a first winding and a second winding.

3. The power tool as recited in claim 1 wherein the first and second inverters are configured to ascertain state data relating to the first and second accumulators and to exchange the state data via a communication connection existing between the first and second inverters.

4. The power tool as recited in claim 3 wherein the state data include current values or voltage values describing a performance of the first and second accumulators.

5. The power tool as recited in claim 3 wherein the state data are selected from at least one of a group consisting of: charge, temperature, source voltage, maximum discharge current, and optimum discharge current of the first and second accumulators.

6. The power tool as recited in claim 1 wherein the speed controller, a current controller or the first and second inverters are implemented in the form of block, trapezoidal or sinusoidal commutation.

7. The power tool as recited in claim 2 wherein the motor is a brushless motor.

8. The power tool as recited in claim 1 further comprising a battery management system or a cell management system.

9. The power tool as recited in claim 8 wherein the battery management system or the cell management system is configured to detect state data relating to the first and second accumulators.

10. A method for carrying out charge equalization between two accumulators in a power tool as recited in claim 1, the method comprising the following steps:
a) operating the power tool, a motor of the power tool being supplied with electrical energy by the first accumulator and the second accumulator;
b) ascertaining state data relating to the first and second accumulators using the first and second power electronics systems;
c) carrying out speed control using the speed controller;

d) carrying out charge equalization between the first and second accumulators as a function of the previously ascertained state data using the first and second charge equalization devices of the first and second power electronics systems;

the first and second power electronics system each having a current flow controller downstream of the first and second charge equalizers.

11. The method as recited in claim 10 wherein the charge equalization is implemented by different load splitting.

12. A power tool comprising:
a first accumulator;
a second accumulator;
a first power electronics system with a first inverter;
a second power electronics system with a second inverter, wherein the first inverter is electrically connected to the first accumulator and the second inverter is electrically connected to the second accumulator;
the first power electronics system including a first charge equalizer and the second power electronics system including a second charge equalizer, the first and second charge equalizers configured to carry out charge equalization between the first and second accumulators; and
a speed controller, the speed controller connected upstream of the first and second charge equalizers;
wherein the first and second inverters are configured to ascertain state data relating to the first and second accumulators and to exchange the state data via a communication connection existing between the first and second inverters.

13. The power tool as recited in claim 12 wherein the state data include current values or voltage values describing a performance of the first and second accumulators.

14. The power tool as recited in claim 12 wherein the state data are selected from at least one of a group consisting of: charge, temperature, source voltage, maximum discharge current, and optimum discharge current of the first and second accumulators.

* * * * *